Jan. 10, 1956  J. L. PROUGH  2,730,327
VEHICLE JACK
Filed Aug. 30, 1950  2 Sheets-Sheet 1
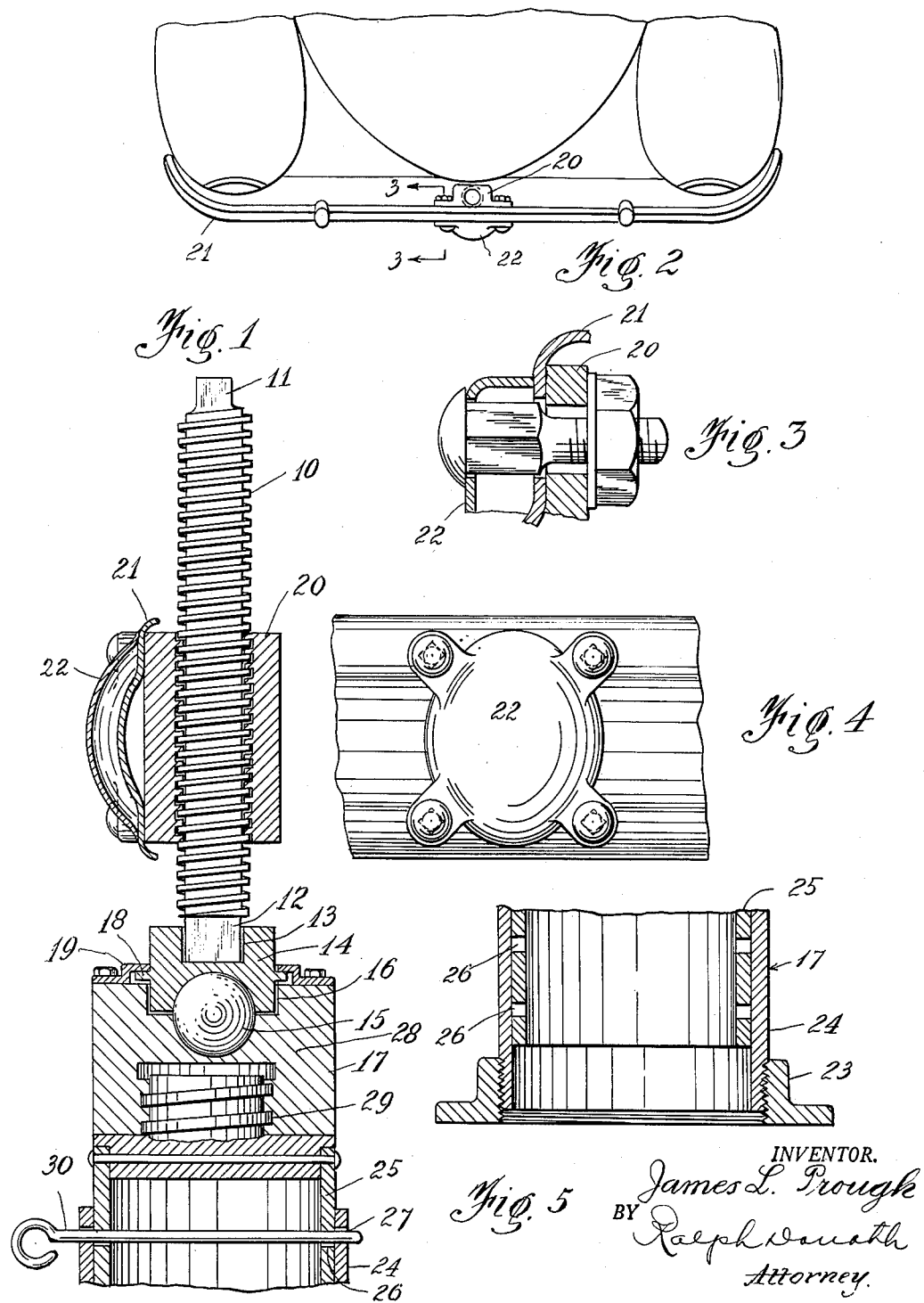

Jan. 10, 1956  J. L. PROUGH  2,730,327
VEHICLE JACK
Filed Aug. 30, 1950  2 Sheets-Sheet 2
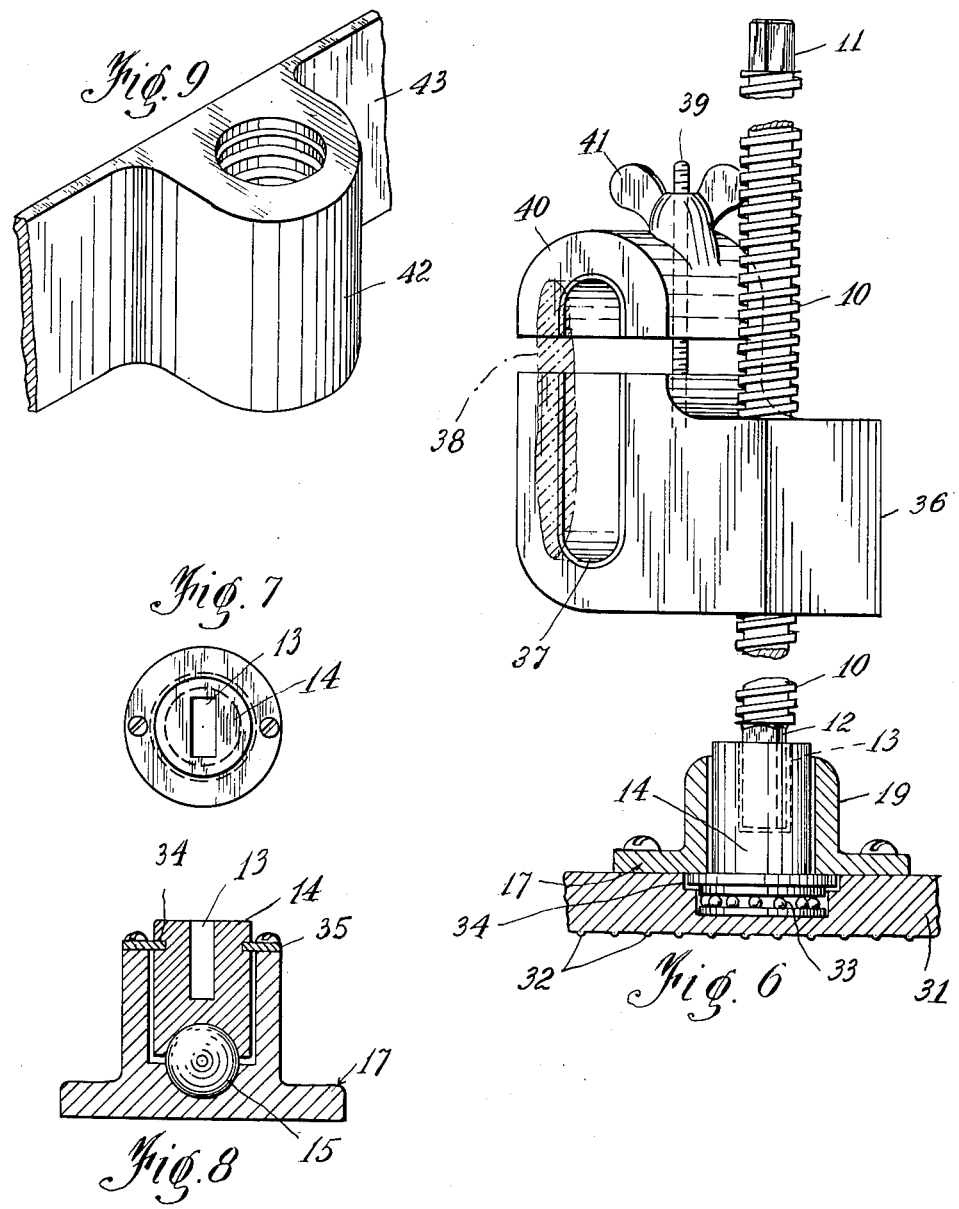
INVENTOR,
James L. Prough
BY
Ralph Donath
Attorney.

United States Patent Office 2,730,327
Patented Jan. 10, 1956

2,730,327

VEHICLE JACK

James L. Prough, Altoona, Pa.

Application August 30, 1950, Serial No. 182,292

6 Claims. (Cl. 254—133)

This invention relates to an improved jack and more particularly to an improved vehicle bumper jack. The development of streamlined automobile bodies and low-slung chassis has made the placement of conventional under-the-axle jacks disagreeable and onerous to a point where they are seldom if ever used for raising passenger automotive vehicles. To overcome the difficulties attendant upon the use of the under-the-axle jack with modern automobiles the so-called "bumper" jack has developed. These jacks are designed, as their name implies, to engage the vehicle bumper and through it lift the frame and wheels. The bumper jack is distinguished from the under-the-axle jack by having a much greater effective lifting distance to compensate for the sag in the vehicle springs as the car frame is lifted by the jack beneath the bumper. The use of the bumper jack, however, raises new difficulties not encountered to any marked degree by the use of under-the-axle jacks. One of the principal problems arises from the fact that one part of the vehicle is raised to an extreme angle with the balance of the vehicle and the supporting surface. This results in the vehicle tending to slide from the jack in one direction or the other. Shifting of the vehicle in this fashion is dangerous and many injuries have resulted, particularly on slippery surfaces or surfaces which are slightly off level. As a result of such accidents, bumper jacks have developed a "bad name" with the public and have not met with the acceptance which they would have been expected to receive.

The present invention provides a bumper jack from which the vehicle supported by it cannot move in any direction no matter what the condition of the supporting surface. This obviates the most undesirable feature of the prior art bumper jacks. Moreover, the jack of this present invention will lift a vehicle to any desired height with ease, it can be placed in position without kneeling and can be taken apart and stored easily in a small space.

The bumper jack of this invention comprises generally a base, an anti-friction bearing means in the base, a jack screw supported by the anti-friction bearing means, a vehicle bumper supporting member threadingly mounted on the jack screw to move up and down the screw as the screw is turned in one direction or the other, a locking member removably fastened to the supporting member and cooperating therewith to engage the vehicle bumper firmly, and removable means for turning the jack screw. The anti-friction bearing may take various forms such as for example a single large ball or a series of ball bearings mounted in a bearing race. The bumper supporting member and locking member may be either in a form that is adapted for permanent installation on a vehicle bumper or they may be in a more readily removable form designed to be taken from the bumper each time the jack is used.

The structure of this invention will be more readily understood by referring to the accompanying drawings in which:

Figure 1 is a central vertical section through a bumper jack according to this invention.

Figure 2 is a top plan view of the front bumper of an automotive vehicle showing one form of bumper supporting member and locking member of this invention.

Figure 3 is a partial section on line 3—3 of Fig. 2.

Figure 4 is a front perspective showing a locking member according to this invention.

Figure 5 is a central vertical section of a segment of adjustable jack base according to this invention.

Figure 6 is a perspective view partially in section of a second embodiment of this invention.

Figure 7 is a top plan view of a jack screw supporting structure adapted to use with this invention.

Figure 8 is a central vertical section of a base and bearing structure according to the invention.

Figure 9 is a perspective view partly broken away of a bumper supporting member.

Referring to the drawings there is illustrated a jack screw 10 having quadrangular upper and lower ends 11 and 12 respectively. The upper end 11 is preferably in the form of a square for engagement with a wrench for turning the jack screw 10. The lower end may be in the form of a rectangle, square or like form for fitting within an opening 13 in a bearing member 14 which runs on an anti-friction bearing such as a single large ball bearing 15 in a well 16 formed in a jack base 17. The bearing member 14 is preferably formed with a flange 18 which is held in position relative to the base by retaining lugs 19 mounted on the base. A bumper supporting member 20 threadingly engages the jack screw 10 for movement up and down the jack screw as the screw is rotated. The bumper supporting member of Figures 1 through 4 is preferably permanently fixed on a bumper 21 of a vehicle by bolting a locking or attaching member 22 to the side of the bumper opposite the supporting member 20. Preferably the screw threads on the jack screw are slightly smaller than the threads in the supporting member so that the screw has some freedom of movement to prevent binding when the vehicle is on a slight tilt. The base 17 is made up of a flange 23 fixed to an outer cylindrical shell 24, an inner shell 25 adapted to slide within the outer shell 24 and provided with openings 26 in the walls thereof for alignment with openings 27 in the outer shell, and a head member 28 threadingly engaging a screw 29 fixed to the top of the inner cylindrical shell 25.

In operating the bumper jack according to this embodiment of the present invention, the jack screw 10 is threaded into the supporting member 20 which is permanently affixed to the bumper. The jack base 17 is opened to the desired extent by raising the inner shell 25 from the outer shell 24 as far as desired and inserting a stop pin 30 through the openings 26 and 27 in the inner and outer shells of the jack base 17. A fine adjustment to bring the jack screw and base into operating relationship is made by screwing the head 28 toward or away from the inner shell 25. The jack screw 10 is turned into the opening 13 in the bearing member and then the vehicle is raised by continuing to turn the jack screw through the bumper supporting member 20 against the bearing member 14.

The base of the jack may be merely a flat plate 31 with anti-skid projections 32 on the bottom as shown in Figure 6. The bearing member 14 may run on a plurality of small ball bearings 33 confined in a race, as shown in Figure 6, instead of on a single large ball as described above or it may be provided with a peripheral groove 34 engaged by a locking ring 35 as shown in Fig. 8 instead of the flange and retaining lug structure previously described.

Where the bumper supporting member is not to be permanently installed on a vehicle bumper the supporting structure illustrated in Figure 6 is provided. In this embodiment the bumper supporting member 36 is provided with a U-shaped channel 37 adapted to receive the lower edge of a vehicle bumper 38. A screw stud 39 projects vertically from the supporting member. A U-shaped locking or attaching member 40 is placed over the screw stud and over the upper edge of the bumper and firmly fastened there by a nut 41 such as a wing nut. In this form the bumper is firmly engaged within the two U-shaped openings and held there by tightening the nut 41 on the screw stud 39.

In still another embodiment a supporting member 42 having projecting arms 43 might be fixed to the bumper by bolts passing through the arms 43 or by welding the arms 43 to the internal face of the bumper.

The jack of this invention has many advantages over the prior art bumper jacks. It can be firmly fixed to the vehicle bumper and will not slip or tilt thereby permitting the car to fall. It in effect becomes a firm fixture, a part of the vehicle, when properly applied.

Certain preferred embodiments of this invention have been illustrated and described herein, however, it will be understood that it may be otherwise embodied within the scope of the following claims.

I claim:

1. A bumper jack comprising a base, anti-friction bearing means in the base, a jack screw removably supported by the bearing means, a vehicle bumper supporting means threadingly mounted on the jack screw to move up and down the screw as the screw is turned in one direction or the other, removable clamping means on the bumper supporting means engaging the portion of the bumper opposite the bumper supporting means and holding the supporting means against removal from the bumper and removable means for turning the jack screw.

2. A bumper jack as claimed in claim 1 in which the anti-friction bearing means includes a substantially cylindrical bearing member and a single ball bearing interposed between the base and the bearing member.

3. A bumper jack as claimed in claim 1 in which the anti-friction bearing means includes a substantially cylindrical bearing member having an opening receiving an end of the jack screw at one end and a peripheral flange adjacent the opposite end thereof, a plurality of ball bearings interposed between the base and the flange end of the bearing member and retaining means on the base engaging the peripheral flange to limit movement of the bearing member away from the base.

4. A bumper jack as claimed in claim 1 in which the vehicle bumper supporting means has a U-shaped channel for receiving one edge of the vehicle bumper, and the removable clamping means is a substantially U-shaped member for receiving the edge of the bumper opposite the U-shaped channel of the supporting means and is held in fixed position on the bumper by a screw stud and nut extending between the supporting means and U-shaped member.

5. A bumper jack as claimed in claim 1 in which the vehicle bumper supporting means is a substantially rectangular block and the clamping means is a convex plate bolted to the rectangular block with the vehicle bumper therebetween.

6. A bumper jack comprising a base, anti-friction bearing means in the base, a jack screw removably supported by the bearing means, a vehicle bumper supporting means frictionally engaging opposite sides of the vehicle bumper, said vehicle supporting and clamping means comprising a U-shaped member receiving the bumper and threadingly engaging the jack screw and an inverted U-shaped member engaging the opposite edge of the bumper and tightening means holding the U-shaped members removably in the bumper, and means for turning the screw jack.

References Cited in the file of this patent

UNITED STATES PATENTS

| | | |
|---|---|---|
| 1,828,913 | Toomey et al. | Oct. 27, 1931 |
| 1,914,286 | Pice | June 13, 1933 |
| 2,043,479 | Greiman | June 9, 1936 |
| 2,164,621 | Pfauser | July 4, 1939 |
| 2,388,308 | Court | Nov. 6, 1945 |
| 2,504,291 | Alderfer | Apr. 18, 1950 |
| 2,554,910 | Jensen | May 29, 1951 |
| 2,590,970 | Jensen | Apr. 1, 1952 |
| 2,621,956 | Brown | Dec. 16, 1952 |
| 2,642,304 | Haynes | June 16, 1953 |

FOREIGN PATENTS

| | | |
|---|---|---|
| 655,458 | Germany | Jan. 15, 1938 |